A. WORK.
HOSE-JACKET.

No. 192,209. Patented June 19, 1877.

WITNESSES.
Saml. J. Colwell
H. W. Hubbard

INVENTOR.
Alanson Work

UNITED STATES PATENT OFFICE.

ALANSON WORK, OF PROVIDENCE, RHODE ISLAND.

IMPROVEMENT IN HOSE-JACKETS.

Specification forming part of Letters Patent No. 192,209, dated June 19, 1877; application filed April 20, 1877.

*To all whom it may concern:*

Be it known that I, ALANSON WORK, of the city and county of Providence, and State of Rhode Island, have invented a new and useful Improvement in Hose-Jackets, which improvement is fully set forth in the following specification, reference being had to the accompanying drawings.

My invention consists in the use of a flexible band to clasp around hose when it bursts for the purpose of stopping the leak, and in so constructing the same that the operation may be rapidly and effectively performed.

Figure 1:
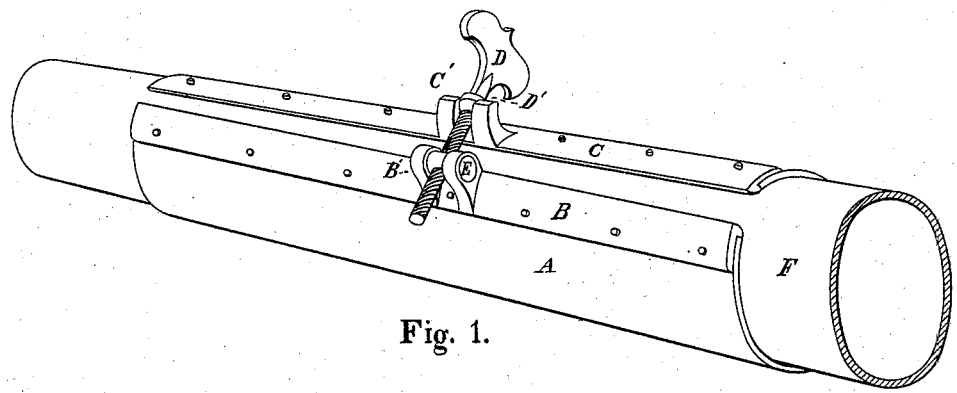
Figure 2:
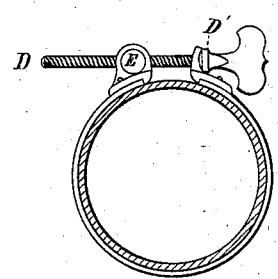
Figure 3:
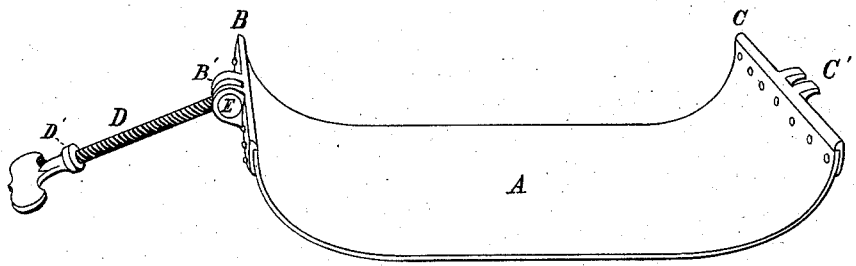

Figure 1 is a view in perspective, showing the jacket clamped around the hose. Fig. 2 is an end view in the same position. Fig. 3 represents the jacket as unclasped and ready to receive the hose.

A represents the flexible band, which I prefer to make of leather, although a compound of rubber and cloth may be used to good advantage. B is a metallic strip, provided with the loops B'. C is a similar strip, provided with the hooks C'. These strips are riveted to the flexible band. D is a screw, provided with a suitable thumb-piece, and with the annular projecting shoulder D', and is preferably cut with a double or triple thread of coarse pitch, to secure rapidity of movement. E is the nut, which is simply a short round rod, threaded to match the screw, and fitted loosely into the loops B', making a swivel-joint, and permitting the screw to swing in and out of the hooks C'.

If preferred, the screw may be reversed and the projection D' placed upon its end.

The operation of my hose-jacket is obvious. When a burst occurs in the hose the jacket is clasped around it, the center of the flexible band being placed over the rent portion and the screw being run out sufficiently to permit the projection D' to pass over the hooks. The screw is then turned until the band is tightened enough to stop the leak.

The importance of rapid action may be seen from that fact that while it is being applied the water is generally flowing out under considerable pressure, sufficient to thoroughly wet the operator.

It will be understood that my invention is not designed to make a permanent repair, but merely to stop the leak temporarily, so as to avoid the necessity of shutting off the water and substituting a perfect length of hose until after the fire is extinguished.

I am aware that the use of a flexible band for the purpose indicated is not new. I therefore do not claim that broadly; but

I claim as new and desire to secure by Letters Patent—

In combination with the flexible band A, provided with the metal supports B and C, the screw D and nut E, so arranged that the nut constitutes the pivot upon which the screw is hinged, substantially as shown and described.

ALANSON WORK.

Witnesses:
JOHN C. PURKIS,
GILMAN E. JOPP.